(No Model.)

C. A. KELLEY.
GRAIN AGITATOR FOR SEPARATOR SHOES.

No. 466,526. Patented Jan. 5, 1892.

Witnesses,
J. H. Nourse
J. A. Bayless

Inventor,
Charles A. Kelley
By Dewey & Co.
Atty

UNITED STATES PATENT OFFICE.

CHARLES A. KELLEY, OF RIPON, CALIFORNIA.

GRAIN-AGITATOR FOR SEPARATOR-SHOES.

SPECIFICATION forming part of Letters Patent No. 466,526, dated January 5, 1892.

Application filed July 13, 1891. Serial No. 399,373. (No model.)

*To all whom it may concern:*

Be it known that I, CHARLES A. KELLEY, a citizen of the United States, residing at Ripon, San Joaquin county, State of California, have invented an Improvement in Grain-Agitators for Separator-Shoes; and I hereby declare the following to be a full, clear, and exact description of the same.

My invention relates to the general class of harvesting-machines, and especially to the class of separators, including both the ordinary thrashing-machines and the combined harvesters.

My invention consists in combination or connection, with the shoe of the separator, of a revolving agitator above said shoe, the object of which is to lift and stir up the material upon the surface of the sieve, thereby affording to the wind a better opportunity of blowing away the chaff and straw and allowing the grain to pass through the sieves or riddles.

My invention also consists in the novel construction of the agitator hereinafter fully described, and specifically pointed out in the claims.

The object of this particular construction is to keep the material from packing or bunching on the sides of the shoe and to agitate and throw it upwardly toward the center, where another portion of the agitator acts upon it to keep it in motion, and allow the wind to more effectually separate the chaff and straw.

Figure 1:
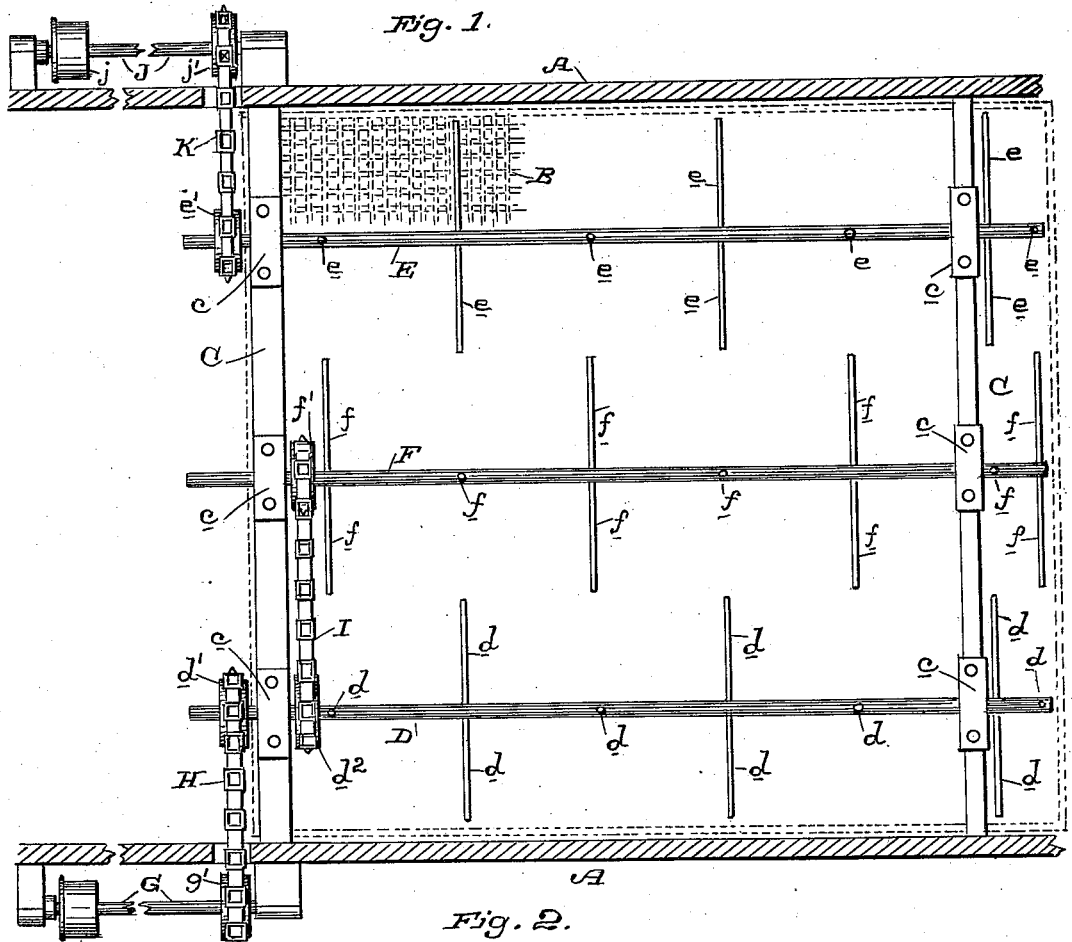
Figure 2:
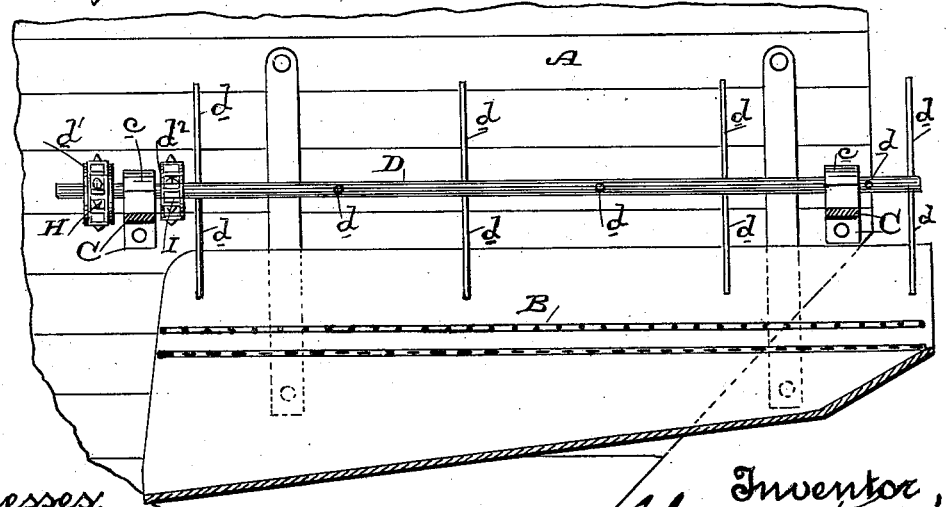

Referring to the accompanying drawings for a more complete explanation of my invention, Figure 1 is a plan of my agitator. Fig. 2 is a side view of same.

A A represent the sides of the thrasher-frame, and B is the shoe.

Secured transversely to the thrasher and bolted to each side thereof, above each end of the shoe, is a bar C, upon which are located the boxes $c$. In one pair of these boxes, near one side of the machine, is a shaft D, which extends lengthwise of the shoe and above it. To this shaft are secured the agitating-fingers $d$, extending therefrom radially in any suitable manner, each set being here shown as consisting of fingers at right angles to each other. Similarly mounted above the shoe, on the other side, is a shaft E, having the agitator-fingers $e$, and between these two shafts is a third shaft F, having the agitator-fingers $f$. The shaft D is caused to revolve by means of a short counter-shaft G on the side of the machine, driven by a pulley $g$ and having a sprocket-wheel $g'$, from which a chain H extends to a sprocket-pulley $d'$ on the shaft D. The central shaft F is driven by means of a chain I from a sprocket-pulley $d^2$ on shaft D to a sprocket-pulley $f'$ on shaft F. The shaft E is driven by means of a counter-shaft J on the other side of the machine, driven by a pulley $j$, carrying a sprocket-pulley $j'$, from which a chain K extends to a sprocket-pulley $e'$ on the shaft E. The shafts D and E are caused to rotate so that their fingers will revolve in a direction to throw the material from the sides to the center of the shoe, while the intervening shaft F revolves in the same direction as the shaft D. The ends of the fingers are raised a suitable distance above the uppermost sieve of the shoe so that they will engage and agitate the material thereon.

The operation of the agitator is as follows: The fingers $d$ and $e$ throw the material from the sides of the shoe, and by their revolution raise it and keep it in suspension as they throw it toward the central portion of the shoe. This keeps the material from packing against either side of the machine, as it has a tendency to do, especially on side hills, and keeps it worked inwardly toward the center of the shoe constantly, at the same time agitating it in such a manner as to afford the wind a better opportunity of blowing away the chaff and straw and keeping the surface of the sieve clear for the passage of the grain. The central fingers provide for the constant agitation of the main body of the material with the same purpose in view of affording the wind a chance to blow away the chaff and straw. All the fingers working transversely of the shoe and from each side of the machine will not throw any of the material off the shoe, as would be the case if the shafts were arranged transversely and the fingers worked longitudinally of the shoe.

I am aware of oscillating side rakes arranged on each side of the thrasher-shoe, the object of which is to keep the material from packing on the sides and to keep it well worked up to the center of the shoe; but these rakes, as they merely oscillate, do not agitate and suspend the material in the way that my revolving fingers do; nor in the device referred to is there any central agitator to accomplish the effect of suspending the main body of material to the action of the wind.

Having thus described my invention, what I claim as new, and desire to secure by Letters Patent, is—

1. In combination with the shoe of a separator, a shaft arranged longitudinally above each side of the shoe, agitator-fingers mounted upon each shaft, and means for rotating the shafts to cause their fingers to agitate and throw the material from the sides to the center of the shoe, substantially as herein described.

2. In combination with the shoe of a separator, the oppositely-revolving outer shafts extending longitudinally over each side of the shoe, the intervening longitudinal shaft over the center of the shoe, and agitator-fingers upon said shafts, substantially as herein described.

3. In combination with the shoe of a separator, the side shafts D and E and intervening shaft F, the agitator-fingers, and the means for driving said shafts, consisting of the side counter-shafts, the chains and pulleys from said shafts to the shafts D and E, and the chain and pulleys from the shaft D to the shaft F, substantially as herein described.

In witness whereof I have hereunto set my hand.

CHARLES A. KELLEY.

Witnesses:
S. H. NOURSE,
J. A. BAYLESS.